US 6,665,743 B2

(12) United States Patent
Benhase et al.

(10) Patent No.: US 6,665,743 B2
(45) Date of Patent: Dec. 16, 2003

(54) METHOD, SYSTEM, AND PROGRAM FOR INITIALIZING A STORAGE SPACE

(75) Inventors: Michael Thomas Benhase, Tucson, AZ (US); David Alan Burton, Vail, AZ (US); Robert Louis Morton, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 09/838,049

(22) Filed: Apr. 18, 2001

(65) Prior Publication Data

US 2002/0156944 A1 Oct. 24, 2002

(51) Int. Cl.$^7$ .......................... G06F 13/00; G06F 13/10
(52) U.S. Cl. ........................ 710/10; 710/8; 711/100; 711/111; 711/114; 711/170
(58) Field of Search ..................... 710/8, 10; 711/100, 711/111, 114, 170

(56) References Cited

U.S. PATENT DOCUMENTS

| | | | | |
|---|---|---|---|---|
| 5,247,674 A | * | 9/1993 | Kogure | 711/170 |
| 5,394,532 A | | 2/1995 | Belsan | |
| 5,475,822 A | * | 12/1995 | Sibigtroth et al. | 712/228 |
| 5,659,704 A | * | 8/1997 | Burkes et al. | 711/114 |
| 5,682,509 A | | 10/1997 | Kabenjian | |
| 5,774,643 A | | 6/1998 | Lubbers et al. | |
| 5,813,025 A | | 9/1998 | Murphy et al. | |
| 5,829,053 A | | 10/1998 | Smith et al. | |
| 5,857,112 A | | 1/1999 | Hashemi et al. | |
| 6,467,023 B1 | * | 10/2002 | DeKoning et al. | 711/114 |

OTHER PUBLICATIONS

Patterson, David A. et al. "A Case for Redundant Arrays of Inexpensive Disks (RAID)", 1988 ACM 0–89791–268–3/88/0006/0109, pp. 109–116.
Chen, Peter M. et al. "Striping in a RAID Level 5 Disk Array", 1995 ACM 0–89791–695–6/95/0005, pp. 136–145.
Chen, Peter M. et al. "RAID: High–Performance, Reliable Secondary Storage", ACM Computing Surveys, vol. 26, No. 2, Jun. 1994, ACM 0360–0300/94/0600–0145, pp. 145–185.
Lee, Edward K. et al. "Performance Consequences of Parity Placement in Disk Arrays", 1991 ACM 0–89791–380–9/91/0003–0190, pp. 190–199.
IBM Corp. "Configuration Planner" from IBM Storage Server, Reference # SC26–7353–03, Dec. 2000, pp. 1–154.
Mylex Corp. "RAID EzAssist v2.00 Configuration Utility User Reference Guide", Part No. 775029–01, 2000, pp. iii–G32.

* cited by examiner

*Primary Examiner*—Rehana Perveen
(74) *Attorney, Agent, or Firm*—David W. Victor; Konrad Raynes & Victor LLP

(57) ABSTRACT

Provided is a method, system, and program for configuring an attached storage device through a storage adaptor. The storage adaptor includes an initialization routine to generate initialization data to write to the storage device when adding storage space in the storage device to a system. A request is received to add storage space to the system. A command is transmitted to the storage adaptor capable of inhibiting the storage adaptor from performing the initialization routine. Initialization data is generated for the storage space and transmitted to the storage adaptor to write to the storage space to initialize the storage space.

39 Claims, 4 Drawing Sheets

METHOD, SYSTEM, AND PROGRAM FOR INITIALIZING A STORAGE SPACE

BACKGROUND OF THE INVENTION

1. Field of the Invention

The present invention relates to a system, method, and program for initializing a storage space.

2. Description of the Related Art

High end storage controllers manage Input/Output (I/O) requests from networked hosts to one or more storage devices, such as a direct access storage device (DASD), Redundant Array of Independent Disks (RAID Array), and Just a Bunch of Disks (JBOD). Storage controllers include one or more host bus adaptor (HBA) cards to communicate with one or more hosts over a network and adaptors to communicate with the storage devices. Many vendors of high end storage controllers provide proprietary hardware. This requires that the user purchase the vendor proprietary adaptors and other components when designing their network system.

There is a trend in the industry toward developing storage controllers that operate in an open systems environment. In one respect, this means that the storage controller can utilize and be compatible with components from other vendors and not require the proprietary hardware and software solutions previously employed.

Notwithstanding the drive in the industry for open systems, the third party vendor components may perform operations that conflict with the storage controller operations.

For these reasons, there is a need in the art to provide techniques to improve the integration of storage controllers with other system components to optimize operations in an open systems environment.

SUMMARY OF THE PREFERRED EMBODIMENTS

Provided is a method, system, and program for configuring an attached storage device through a storage adaptor. The storage adaptor includes an initialization routine to generate initialization data to write to the storage device when adding storage space in the storage device to a system. A request is received to add storage space to the system. A command is transmitted to the storage adaptor capable of inhibiting the storage adaptor from performing the initialization routine. Initialization data is generated for the storage space and transmitted to the storage adaptor to write to the storage space to initialize the storage space.

Additionally, the initialization data transmitted to the storage adaptor enables data integrity and error correction and recovery operations on the storage space.

In still further implementations, the initialization data is in a first format and the initialization data the storage adaptor applies when executing the initialization routine is in a second format. The storage adaptor is not capable of performing data integrity and error recovery operations when the storage space is initialized with initialization data in the first format.

In certain implementations, the requested storage space comprises a RAID rank.

Further provided is a method, system, an program for configuring an attached storage device. A requested configuration for the attached storage device and command to set a first state is received. The first state is indicated in response to the received command. A determination is made as to whether the first state or a second state is indicated. An initialization routine is executed to generate and write initialization data to the storage space to implement the requested configuration if the second state is indicated. If the first state is indicated, then initialization data is received to write to the storage space to implement the requested configuration without executing the initialization routine.

The described implementations provide a technique for initializing and configuring a storage space with a storage adaptor card including an initialization routine for performing a separate initialization of the storage space. With the described implementations, the storage adaptor is inhibited from executing its initialization routine to allow initialization data to be generated and applied from an external component, such as from a storage subsystem controller in which the storage adaptor is installed, thereby avoiding having the storage adaptor card perform a redundant initialization operation.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Integrating Third Party Components with a Storage Controller System

One problem that has been observed when using components from third parties with a storage controller, such as the International Business Machines Corporation (IBM) Enterprise Storage Server (ESS), is that during initialization the third party component and storage controller may not coordinate their configuration operations. This lack of coordination may result in incompatible and/or redundant actions.** For instance, when using a PCI RAID adaptor card from a third party vendor with the IBM ESS storage controller, both the PCI RAID card and the ESS storage controller will separately initialize the storage device. To configure hard disk drives in a RAID array having 524 byte sectors, the PCI RAID adaptor will initialize each sector by writing 522 bytes of zero data to the sector followed by a two byte longitudinal redundancy code (LRC) used for error recovery and data integrity checking purposes by the PCI RAID adaptor. The LRC code may be seeded with the sector number or Logical Block Address (LBA) of the sector. This process of the PCI RAID card initializing each sector with zero data and the two byte LRC code with the seeded LBA can take up to several hours.

**Enterprise Storage Server and IBM are trademarks of International Business Machines Corporation.

Following the initialization of the PCI RAID card, the ESS storage controller will also initialize the sectors of a logical volume being created with data and codes for error recovery and correction. In particular, the ESS storage controller initializes each sector to include an eight byte header at the beginning of the sector and then at the end of the sector initializes a two byte sequence number of the logical sector number and a two byte LRC code seeded with the physical sector number (LBA). Further, the ESS storage controller also writes all zeroes to the 512 bytes of data between the header and sequence number and seeded LRC code.

Thus, one problem with integrating a third party vendor PCI RAID card with the ESS storage subsystem is the redundant initialization operations. The PCI RAID adaptor initialization, which takes a considerably long time to perform, is eventually overwritten by the initialization performed by the ESS storage controller. The described implementations provide a technique for addressing this problem.

Figure 1:
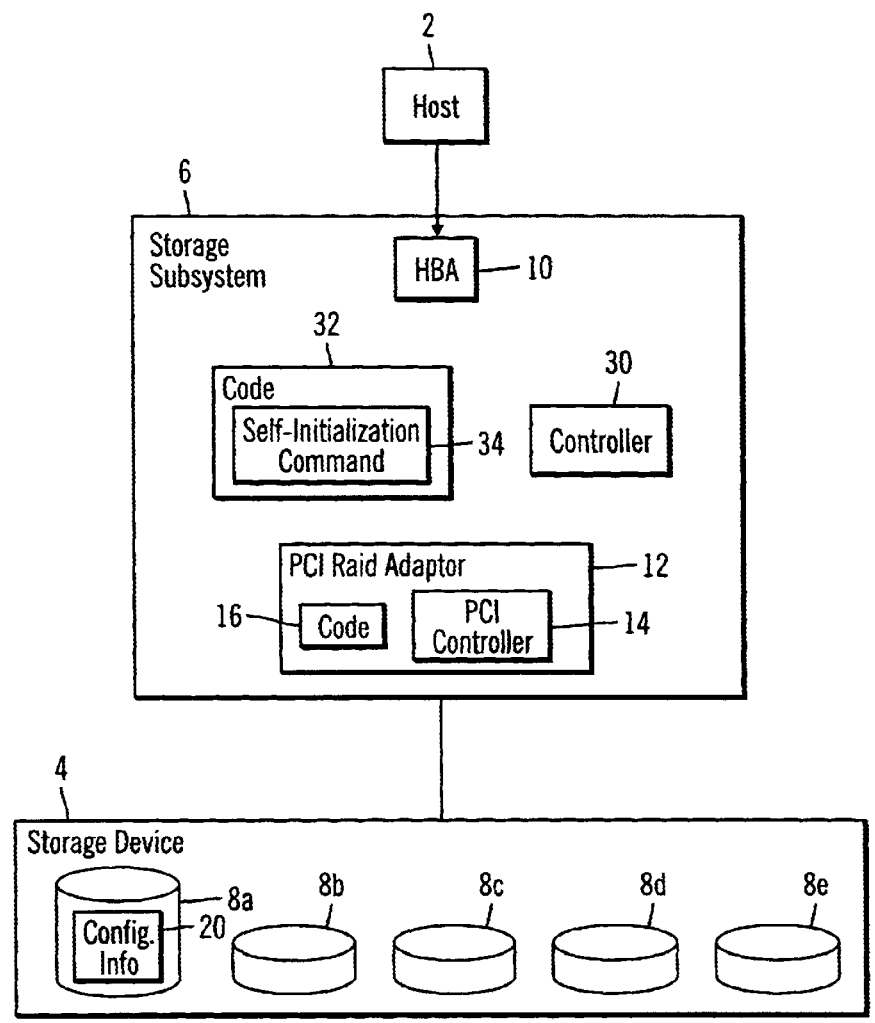
FIG. 1 illustrates a computing environment in which aspects of the invention are implemented.

FIG. 1 illustrates a computing environment in which aspects of the invention are implemented. A host system 2 transmits Input/Output (I/O) requests to a storage device 4 through a storage subsystem 6 which manages access to the storage device 4. The storage device 4 is comprised of a plurality of hard disk drives 8a, b, c, d, e in accordance with RAID array storage devices known in the art. The storage subsystem 6 includes a host bus adaptor (HBA) 10 to enable communication with the host 2 and a Peripheral Component Interconnect (PCI) RAID adaptor 12 to allow access to the disk drives 8a, b, c, d, e in the storage device 4. Further, the PCI RAID adaptor 12 is capable of configuring and initializing the disk drives 8a, b, c, d, e as RAID devices and striping data to the disk drives 8a, b, c, d, e in a manner known in the art.

In the described implementations, the PCI RAID adaptor 12 is capable of being used with different host and storage subsystems. The PCI RAID adaptor 12 includes a PCI controller 14 processor and code 16 in non-volatile storage (not shown), e.g., a Programmable Read Only Memory (PROM), Electronically Erasable Read Only Memory (EEPROM), Read-Only Memory (ROM) or any other non-volatile storage device known in the art. The PCI controller 14 executes the code 16 to initialize the hard disk drives 8a, b, c, d, e in the storage device 6 by writing all zeros or other initialization data to the data section of the sector followed by an LRC code for the sector in a manner known in the art. After initializing a storage device 4 to function as a RAID device, the PCI RAID adaptor 12 would update configuration information 20. In FIG. 1, the configuration information 20 is shown as maintained in the storage device 4. Additionally, the configuration information 20 may be maintained in a memory device within the PCI RAID adaptor 12, such as a volatile or nonvolatile memory device, e.g., a battery backed up RAM. Below are three possible states for the configuration information 20 for the storage device:

Not available: indicates that the storage device 4 has not yet been configured and initialized. Detection of this state will cause the PCI RAID adaptor 12 to enter a configuration mode to initialize and configure the disk drives 8a, b, c, d, e as a RAID device in a manner known in the art.

Initialized: indicates that the disk drives 8a, b, c, d, e have been configured and initialized with data and LRC codes and are ready for use. Once the array status 20 indicates "initialized", the PCI RAID adaptor 12 assumes that it is capable of performing error recovery on the storage device 4 in a manner known in the art. If the array status 20 does not indicate initialized, then the PCI RAID adaptor 12 may attempt to configure and initialize the disk drives 8a, b, c, d, e in the storage device 4.

Initialization Override: a state in which the PCI RAID adaptor 12 performs full stripe writes of data to the disk drives 8a, b, c, d, e to write at once the data and parity for an entire stripe.

In addition to the above state information, the configuration information 20 would further indicate a RAID level, the write caching method, stripe size, disks 8a, b, c, d, e involved in the configuration, and any other RAID information necessary to maintain the RAID array.

The storage subsystem 6 includes a controller 30 to execute code 32 in a non-volatile storage unit (not shown), e.g., ROM, PROM, EEPROM, etc., to perform storage subsystem operations in a manner known in the art. Further, the code 32 includes a self-initialization command 34 that when communicated to the PCI RAID adaptor 12 causes the PCI RAID adaptor 12 to enter the "Initialization Override" state, indicated in the configuration information 20, in which the PCI RAID adaptor does not perform the initialization operations defined in the PCI RAID adaptor code 16, and instead performs the full stripe writes of the initialization data supplied by the storage subsystem controller 30.

Figure 2:
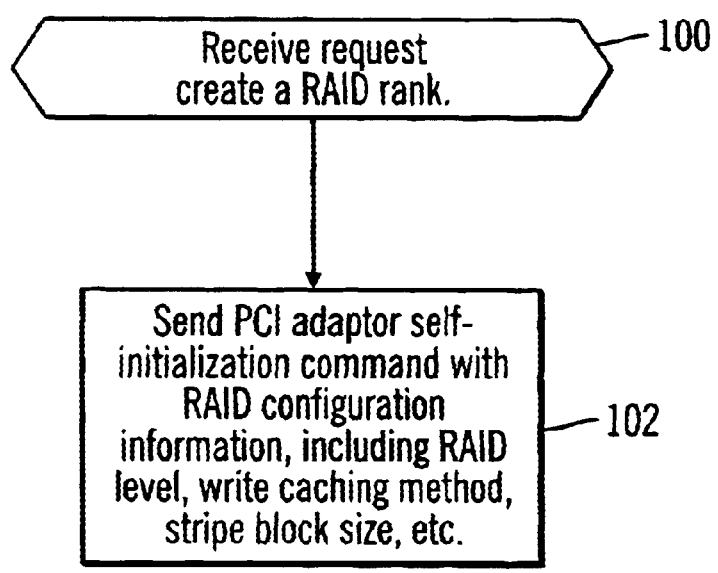
FIG. 2 illustrates logic implemented in a storage subsystem to create a RAID rank in accordance with implementations of the invention.

FIG. 2 illustrates logic implemented in the storage subsystem code 32 to process a request to create a RAID rank in the storage device 4. In the described implementations, an administrator may create the RAID rank to allocate to a logical volume that will be added to the storage device 4. In certain described implementations, the disks 8a, b, c, d, e are initially formatted as 524 byte sector blocks. Control begins at block 100 with the controller 30 receiving a request to initialize a RAID rank in the storage device 4. The storage subsystem 6 would then transmit (at block 102) a self-initialization command with RAID configuration information to the PCI RAID adaptor card 12, indicating the RAID level, the write caching method, e.g., write through, write back, the stripe size, disks to use in configuration, etc.

Figure 3:
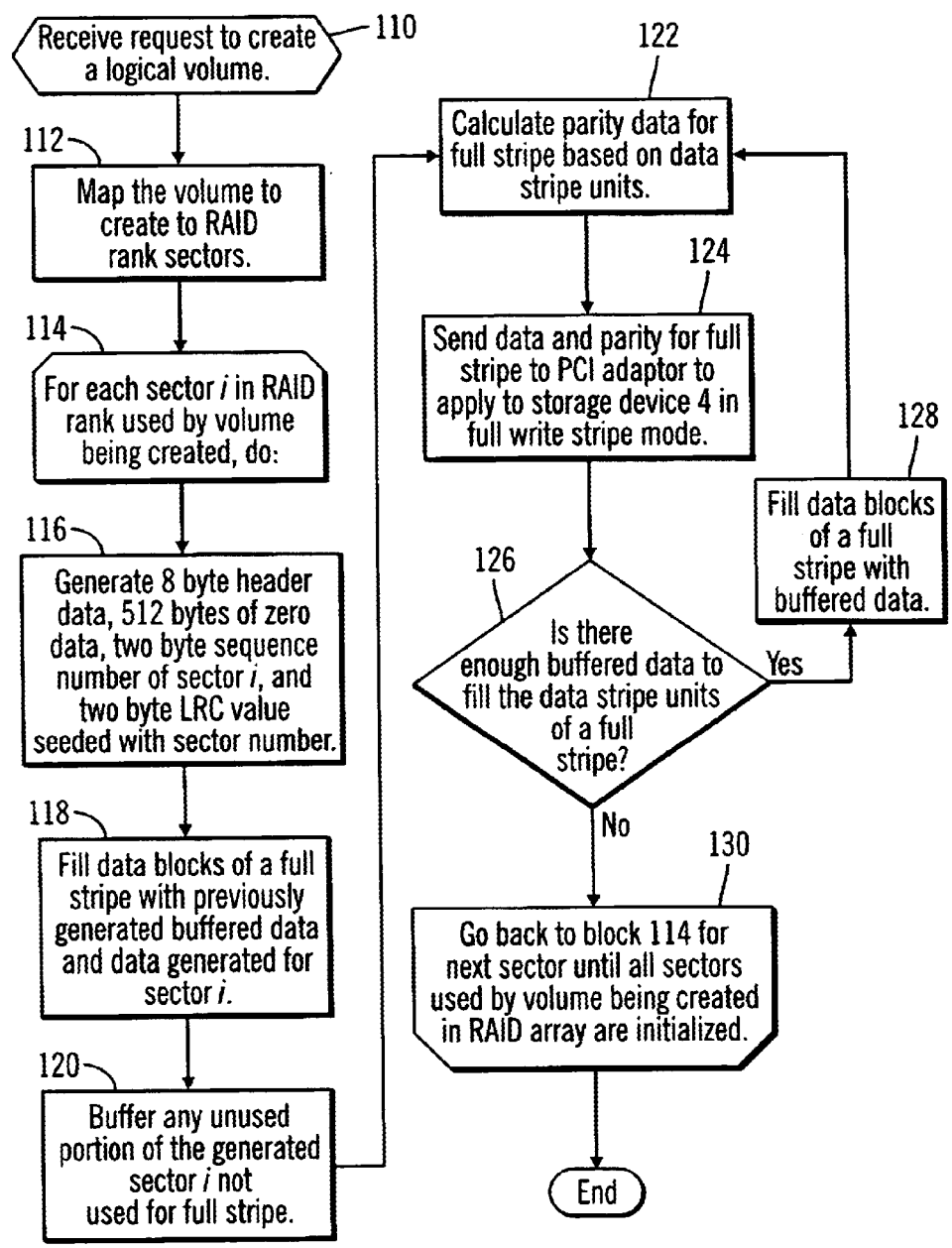
FIG. 3 illustrates logic implemented in the storage subsystem to initialize data in a storage space through an attached storage adaptor card in accordance with implementations of the invention.

FIG. 3 illustrates logic implemented in the controller 30 to initialize a logical volume in the RAID rank created with the logic of FIG. 2. Control begins at block 110 with the controller 30 receiving a request to create a logical volume. The controller 30 would then map (at block 112) the logical volume to create to RAID rank sectors, such as the sectors in the RAID rank created with the logic of FIG. 2. At blocks 114 to 130, the controller 30 performs blocks 116 through 128 for each sector i in the RAID rank to initialize for the new logical volume. At block 116, the controller 30 generates for sector i an eight byte header, 512 bytes of zero data to initialize the 512 data bytes to zero, a two byte sequence number indicating the logical sequence number of sector i in the RAID array, and an LRC code seeded with the sequence number. The controller 30 then builds (at block 118) the data stripe units of a full stripe with previously buffered sector initialization data and initialization data generated for sector i. The controller 30 buffers (at block 120) any initialization data for sector i that is not included in the full stripe and calculates (at block 122) parity data for the data included in the full stripe. The controller 30 then transmits (at block 124) the full stripe of sector data and its parity to the PCI RAID adaptor 12 to perform a full write stripe of the initialization data to all the disks 8a, b, c, d, e involved in the RAID configuration.

If (at block 126) there is enough buffered sector initialization data to fill a full stripe, then the controller 30 builds (at block 128) another full stripe with the buffered data and returns to block 122 to calculate and add the parity data for the stripe and transmit the full stripe including data and parity to the PCI RAID adaptor 12. If there is not enough buffered data to build an entire full stripe, then control proceeds (at block 130) back to block 104 to initialize the next sector for the new volumes until all the sectors allocated to the new logical volume in the RAID rank are initialized.

FIG. 3 illustrates logic implemented in the PCI RAID adaptor code 16 to perform a self-initialization of a RAID array under control of the storage subsystem 4. Control begins at block 150 upon receiving a self-initialization command with configuration information from the storage subsystem controller 30. The PCI controller 14 then updates (at block 152) the configuration information 20 with the configuration information provided with the self-initialization command, e.g., RAID level, write caching method, stripe size, disks to use in configuration, etc. The PCI raid controller 14 uses the RAID configuration information 20 to determine how to stripe data across the disks 8a, b, c, d, e selected for the RAID array being created. If (at block 156) the status is "Initialization Override", then (at block 158) the PCI controller 14 does not perform any initialization, and the RAID rank creation is complete. Otherwise, the PCI controller 14 performs (at block 160) normal initialization handling to initialize the RAID rank using the RAID configuration information 20 in a manner known in the art.

Figure 4:
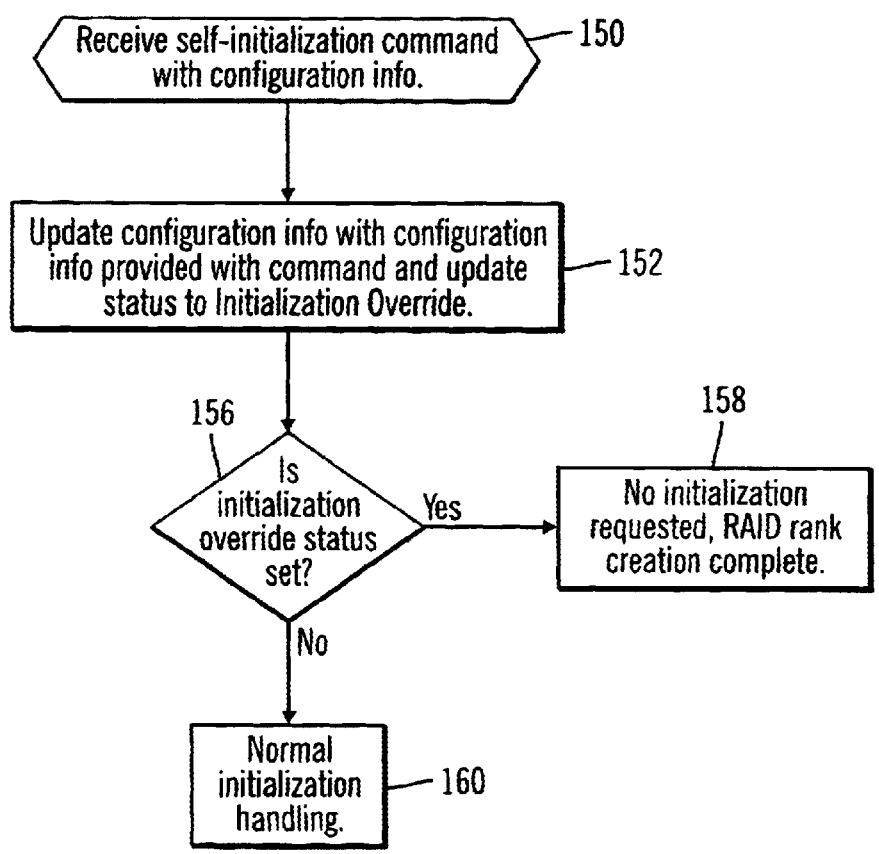
FIG. 4 illustrates logic implemented in a storage adaptor card installed in a storage subsystem to initialize data in a storage space in accordance with implementations of the invention.

After the RAID rank is created with the logic of FIGS. 2 and 4, the controller 30 may initialize sectors in the new RAID rank to allocate to one or more new logical volumes according to the logic of FIG. 3.

With the process of FIGS. 2, 3, and 4, the storage subsystem 6 handles the initialization of the data sectors in a RAID rank in the storage device 4 by adding header and sector information that the storage subsystem controller 30 is capable of using for data integrity, error correction and recovery operations. With the described implementations, the extent and time needed for initialization operations is substantially reduced because the PCI RAID adaptor 12 is inhibited from performing a separate initialization, which could take several hours. The described implementations are particularly useful when a third party PCI RAID adaptor is used with the storage subsystem, which must perform its own high level initialization of the sectors.

Without the above described implementation that inhibit the PCI RAID adaptor from performing an initialization, the PCI RAID adaptor would separately initialize all the sectors of the disks 8a, b, c, d, e in the new RAID array with data that the storage subsystem 6 will eventually have to overwrite with the initialization information the storage subsystem 6 uses to maintain data integrity and provide error recovery and correction. Thus, the described implementations optimize configuration and initialization operations when integrating third party PCI RAID adaptor cards with a storage subsystem that implement a separate initialization pattern. Further, with the described implementations, to the extent the storage subsystem initialization data is different from the initialization data the PCI RAID adaptor 12 would add, only the storage subsystem 4 can perform the data integrity and error correction operations because the initialization format of the sectors generated by the storage subsystem is different from the initialization format generated by the PCI RAID adaptor 12.

The following describes some additional implementations.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The preferred logic of FIGS. 2–4 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

In the described implementations, data was transferred in sectors. In alternative implementations, blocks of data may be transferred in storage units other than sectors.

In the described implementations, the storage subsystem 6 was submitting the self-initialization command to configure a RAID storage device. Additionally, the above described configuration and initialization operations can be used to configure non-RAID storage devices. In such case, the configuration information would describe the attributes and properties of the non-RAID configuration.

In the described implementations, the PCI raid adaptor 12 and storage subsystem 6 initialized the storage device 4 with different initialization data formats. In additional implementations, the storage subsystem and PCI RAID adaptor may initialize sectors with formats different than those described herein.

The adaptor which the storage subsystem 6 controlled comprised a PCI RAID adaptor. However, the storage subsystem initialization technique described herein can also be utilized with other types of storage adaptors, e.g., Small Computer System Interface (SCS), Fibre Channel, etc., adaptors. In such case, the storage subsystem 6 would submit the self-initialization command to inhibit the storage adaptor from performing a redundant configuration of the storage device 4 when the storage subsystem will ultimately overwrite the storage adaptor initialization.

In the described implementations, the PCI RAID adaptor is used in a storage subsystem. Additionally, the storage subsystem may comprise any device, e.g., a host, computer, etc, that uses an adaptor to configure an attached storage device.

In the described implementations, the disk drives 8a, b, c, d, e comprised magnetic hard disk drives. In alternative implementations, the storage device 4 may comprise any storage device known in the art, such as optical disks, tapes, etc.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for configuring an attached storage device through a storage adaptor, wherein the storage adaptor includes an initialization routine to generate initialization data to write to the storage device when adding storage space in the storage device for use by a system, comprising:

receiving a request to add storage space to the system;

transmitting a command to the storage adaptor capable of inhibiting the storage adaptor from performing the initialization routine;

generating initialization data for the storage space; and transmitting initialization data to the storage adaptor to write to the storage space to initialize the storage space.

2. The method of claim 1, wherein the initialization data transmitted to the storage adaptor enables data integrity and error correction and recovery operations on the storage space.

3. The method of claim 2, wherein the initialization data is in a first format and the initialization data the storage adaptor writes when executing the initialization routine is in a second format, wherein the storage adaptor is not capable of performing data integrity and error recovery operations when the storage space is initialized with data in the first format.

4. The method of claim 1, wherein the storage space is divided into sectors, wherein the initialization data includes an error correction code for each sector used to perform error correction on the sector.

5. The method of claim 1, wherein the requested storage space comprises a RAID rank.

6. The method of claim 5, wherein the storage space is divided into sectors, wherein initialization data is generated for each sector and includes an error correction code for each sector, further comprising:

providing initialization data for a full write stripe from the sector initialization data; and generating parity data for the provided initialization data to include in the full write stripe, wherein the full write stripe is transmitted to the storage adaptor to apply as a full write stripe to the storage space.

7. A method for configuring an attached storage device, comprising:

receiving a requested configuration of a storage space in the attached storage device;

receiving a command to set a first state;

indicating the first state in response to receiving the command;

determining whether the first state or a second state is indicated;

executing an initialization routine to generate and write initialization data to the storage space to implement the requested configuration if the second state is indicated; and receiving initialization data to write to the storage space to implement the requested configuration if the first state is indicated without executing the initialization routine.

8. The method of claim 7, further comprising:

receiving a command after receiving the command to set the first state; and indicating that the initialization is complete in response to receiving the command.

9. The method of claim 7, wherein the received initialization data enables data integrity and error correction and recovery operations on the storage space.

10. The method of claim 9, wherein the received initialization data is in a first format and the initialization data generated during the execution of the initialization routine is in a second format.

11. The method of claim 7, wherein the storage space is divided into sectors, wherein the initialization data includes an error correction code for each sector used to perform error correction on the sector.

12. The method of claim 7, wherein the requested storage space configuration specifies a RAID rank.

13. The method of claim 12, wherein the storage space is divided into sectors, wherein initialization data generated for each sector includes an error correction code for each sector, wherein when the first state is set, further comprising:

receiving initialization data for a full stripe including parity data for the full write stripe; and performing a full write stripe to write the received full stripe to the storage space.

14. A storage system for configuring a storage device, comprising:

a storage adaptor attached to the storage device, wherein the storage adaptor implements an initialization routine to generate initialization data to write to the storage device when adding storage space in the storage device;

means for receiving a request to add storage space;

means for transmitting a command to the storage adaptor capable of inhibiting the storage adaptor from performing the initialization routine;

means for generating initialization data for the storage space; and means for transmitting initialization data to the storage adaptor to write to the storage space to initialize the storage space.

15. The storage system of claim 14, wherein the initialization data transmitted to the storage adaptor enables data integrity and error correction and recovery operations on the storage space.

16. The storage system of claim 15, wherein the initialization data is in a first format and the initialization data the storage adaptor writes when executing the initialization routine is in a second format, wherein the storage adaptor is not capable of performing data integrity and error recovery operations when the storage space is initialized with data in the first format.

17. The storage system of claim 14, wherein the storage space is divided into sectors, wherein the initialization data includes an error correction code for each sector used to perform error correction on the sector.

18. The storage system of claim 14, wherein the requested storage space comprises a RAID rank.

19. The storage system of claim 18, wherein the storage space is divided into sectors, wherein initialization data is generated for each sector and includes an error correction code for each sector, further comprising:

means for providing initialization data for a full write stripe from the sector initialization data; and means for generating parity data for the provided initialization data to include in the full write stripe, wherein the full write stripe is transmitted to the storage adaptor to apply as a full write stripe to the storage space.

20. A system for configuring a storage device, comprising:

means for receiving a requested configuration of a storage space in the attached storage device;

means for receiving a command to set a first state;

means for indicating the first state in response to receiving the command;

means for determining whether the first state or a second state is indicated;

means for executing an initialization routine to generate and write initialization data to the storage space to implement the requested configuration if the second state is indicated; and means for receiving initialization data to write to the storage space to implement the requested configuration if the first state is indicated without executing the initialization routine.

21. The system of claim 20, further comprising:

means for receiving a command after receiving the command to set the first state; and means for indicating that the initialization is complete in response to receiving the command.

22. The system of claim 20, wherein the received initialization data enables data integrity and error correction and recovery operations on the storage space.

23. The system of claim 22, wherein the received initialization data is in a first format and the initialization data generated during the execution of the initialization routine is in a second format.

24. The system of claim 20, wherein the storage space is divided into sectors, wherein the initialization data includes an error correction code for each sector used to perform error correction on the sector.

25. The system of claim 20, wherein the requested storage space configuration specifies a RAID rank.

26. The system of claim 25, wherein the storage space is divided into sectors, wherein initialization data generated for each sector includes an error correction code for each sector, wherein when the first state is set, further comprising:

means for receiving initialization data for a full stripe including parity data for the full write stripe; and means for performing a full write stripe to write the received full stripe to the storage space.

27. An article of manufacture for configuring a storage device through a storage adaptor, wherein the storage adaptor includes an initialization routine to generate initialization data to write to the storage device when adding storage space in the storage device for use by a system, by:

receiving a request to add storage space to the system;

transmitting a command to the storage adaptor capable of inhibiting the storage adaptor from performing the initialization routine;

generating initialization data for the storage space; and transmitting initialization data to the storage adaptor to write to the storage space to initialize the storage space.

28. The article of manufacture of 27, wherein the initialization data transmitted to the storage adaptor enables data integrity and error correction and recovery operations on the storage space.

29. The article of manufacture of 28, wherein the initialization data is in a first format and the initialization data the storage adaptor writes when executing the initialization routine is in a second format, wherein the storage adaptor is not capable of performing data integrity and error recovery operations when the storage space is initialized with data in the first format.

30. The article of manufacture of 27, wherein the storage space is divided into sectors, wherein the initialization data includes an error correction code for each sector used to perform error correction on the sector.

31. The article of manufacture of 27, wherein the requested storage space comprises a RAID rank.

32. The article of manufacture of 31, wherein the storage space is divided into sectors, wherein initialization data is generated for each sector and includes an error correction code for each sector, further comprising:

means for providing initialization data for a full write stripe from the sector initialization data; and means for generating parity data for the provided initialization data to include in the full write stripe, wherein the full write stripe is transmitted to the storage adaptor to apply as a full write stripe to the storage space.

33. An article of manufacture for configuring a storage device by:

receiving a requested configuration of a storage space in the attached storage device;

receiving a command to set a first state;

indicating the first state in response to receiving the command;

determining whether the first state or a second state is indicated;

executing an initialization routine to generate and write initialization data to the storage space to implement the requested configuration if the second state is indicated; and receiving initialization data to write to the storage space to implement the requested configuration if the first state is indicated without executing the initialization routine.

34. The article of manufacture of claim 33, further comprising:

means for receiving a command after receiving the command to set the first state; and means for indicating that the initialization is complete in response to receiving the command.

35. The article of manufacture of claim 33, wherein the received initialization data enables data integrity and error correction and recovery operations on the storage space.

36. The article of manufacture of claim 35, wherein the received initialization data is in a first format and the initialization data generated during the execution of the initialization routine is in a second format.

37. The article of manufacture of claim 33, wherein the storage space is divided into sectors, wherein the initialization data includes an error correction code for each sector used to perform error correction on the sector.

38. The article of manufacture of claim 33, wherein the requested storage space configuration specifies a RAID rank.

39. The article of manufacture of claim 37, wherein the storage space is divided into sectors, wherein initialization data generated for each sector includes an error correction code for each sector, wherein when the first state is set, further comprising:

receiving initialization data for a full stripe including parity data for the full write stripe; and performing a full write stripe to write the received full stripe to the storage space.

* * * * *